(12) United States Patent
Becker

(10) Patent No.: US 11,234,411 B2
(45) Date of Patent: Feb. 1, 2022

(54) ODOR ELIMINATING PET BED ASSEMBLY

(71) Applicant: Peter Becker, San Diego, CA (US)

(72) Inventor: Peter Becker, San Diego, CA (US)

( * ) Notice: Subject to any disclaimer, the term of this patent is extended or adjusted under 35 U.S.C. 154(b) by 215 days.

(21) Appl. No.: 16/787,932

(22) Filed: Feb. 11, 2020

(65) Prior Publication Data
US 2021/0243996 A1   Aug. 12, 2021

(51) Int. Cl.
*A01K 1/035* (2006.01)

(52) U.S. Cl.
CPC ................. *A01K 1/0353* (2013.01)

(58) Field of Classification Search
CPC .... A01K 1/0353; A01K 1/015; A01K 1/0157; A01K 1/02
See application file for complete search history.

(56) References Cited

U.S. PATENT DOCUMENTS

| | | | |
|---|---|---|---|
| 5,144,911 A * | 9/1992 | Moore ................. | A01K 1/0353 119/28.5 |
| 5,662,065 A * | 9/1997 | Bandimere .......... | A01K 1/0353 119/28.5 |
| 5,685,257 A | 11/1997 | Feibus | |
| 5,784,995 A | 7/1998 | Willinger | |
| 6,173,675 B1 | 1/2001 | Licciardo | |
| 6,925,963 B2 | 8/2005 | Duffy | |
| D820,527 S | 6/2018 | Romaya | |
| 10,881,080 B2 * | 1/2021 | Komatsubara ....... | A01K 1/0353 |
| 2004/0216680 A1 * | 11/2004 | Lamstein ............. | A01K 1/0353 119/28.5 |
| 2005/0224000 A1 * | 10/2005 | Holte ........................ | A61F 5/01 119/28.5 |
| 2006/0060147 A1 | 3/2006 | Appelhaus | |
| 2006/0272581 A1 * | 12/2006 | Dunn .................... | A01K 1/0353 119/28.5 |
| 2006/0272582 A1 * | 12/2006 | Dunn ................... | A01K 1/0353 119/28.5 |
| 2012/0118239 A1 * | 5/2012 | Jacquart ............... | A01K 1/0353 119/28.5 |
| 2012/0234246 A1 | 9/2012 | Spence | |
| 2012/0291711 A1 * | 11/2012 | Baker .................. | A01K 1/0353 119/28.5 |
| 2014/0165923 A1 * | 6/2014 | Diamond ............. | A01K 1/0353 119/706 |
| 2016/0205892 A1 * | 7/2016 | Hills ..................... | A01K 1/0353 |
| 2017/0280679 A1 * | 10/2017 | Swedyk ............... | A01K 1/0157 |

FOREIGN PATENT DOCUMENTS

WO        WO0156372        8/2001

* cited by examiner

*Primary Examiner* — Trinh T Nguyen

(57) ABSTRACT

An odor eliminating pet bed assembly for absorbing odors associated with pet beds includes a pet bed that is positionable on a support surface for to have a pet lie thereon. The pet bed has a chamber is integrated therein for receiving an odor absorbing material. A permeable cushion is positioned within the pet bed to have the pet lie thereon when the pet is in the pet bed. The permeable cushion passes the odor absorbing material therethrough. An impermeable cushion is positioned within the pet bed to have the pet lie thereon. The impermeable cushion is comprised of a fluid impermeable material to inhibit the odor absorbing material from passing therethrough.

7 Claims, 3 Drawing Sheets

ODOR ELIMINATING PET BED ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pet bed devices and more particularly pertains to a new pet bed device for absorbing odors associated with pet beds.

(2) Description of Related Art Including Information Disclosed Under 37 CFR 1.97 and 1.98

The prior art relates to pet bed devices. The prior art discloses a variety of different pet beds, all including an odor absorbing layer for reducing odors associated with pet beds. The prior art discloses a pet bed that has a porous layer and a cartridge chamber therein for receiving an odor eliminating cartridge. The prior art discloses a pet bed that is fillable with herbaceous materials, the scent and volatile effects of which can be inhaled by a pet lying on the pet bed. The prior art also discloses a pet bed that has a permeable layer and an impermeable layer, each being separated to define a chamber in the pet bed for receiving anti-flea agents. The prior art does not disclose the combination of a permeable layer, an impermeable layer and a raised border extending around the pet bed.

BRIEF SUMMARY OF THE INVENTION

An embodiment of the disclosure meets the needs presented above by generally comprising a pet bed that is positionable on a support surface for to have a pet lie thereon. The pet bed has a chamber is integrated therein for receiving an odor absorbing material. A permeable cushion is positioned within the pet bed to have the pet lie thereon when the pet is in the pet bed. The permeable cushion passes the odor absorbing material therethrough. An impermeable cushion is positioned within the pet bed to have the pet lie thereon. The impermeable cushion is comprised of a fluid impermeable material to inhibit the odor absorbing material from passing therethrough.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
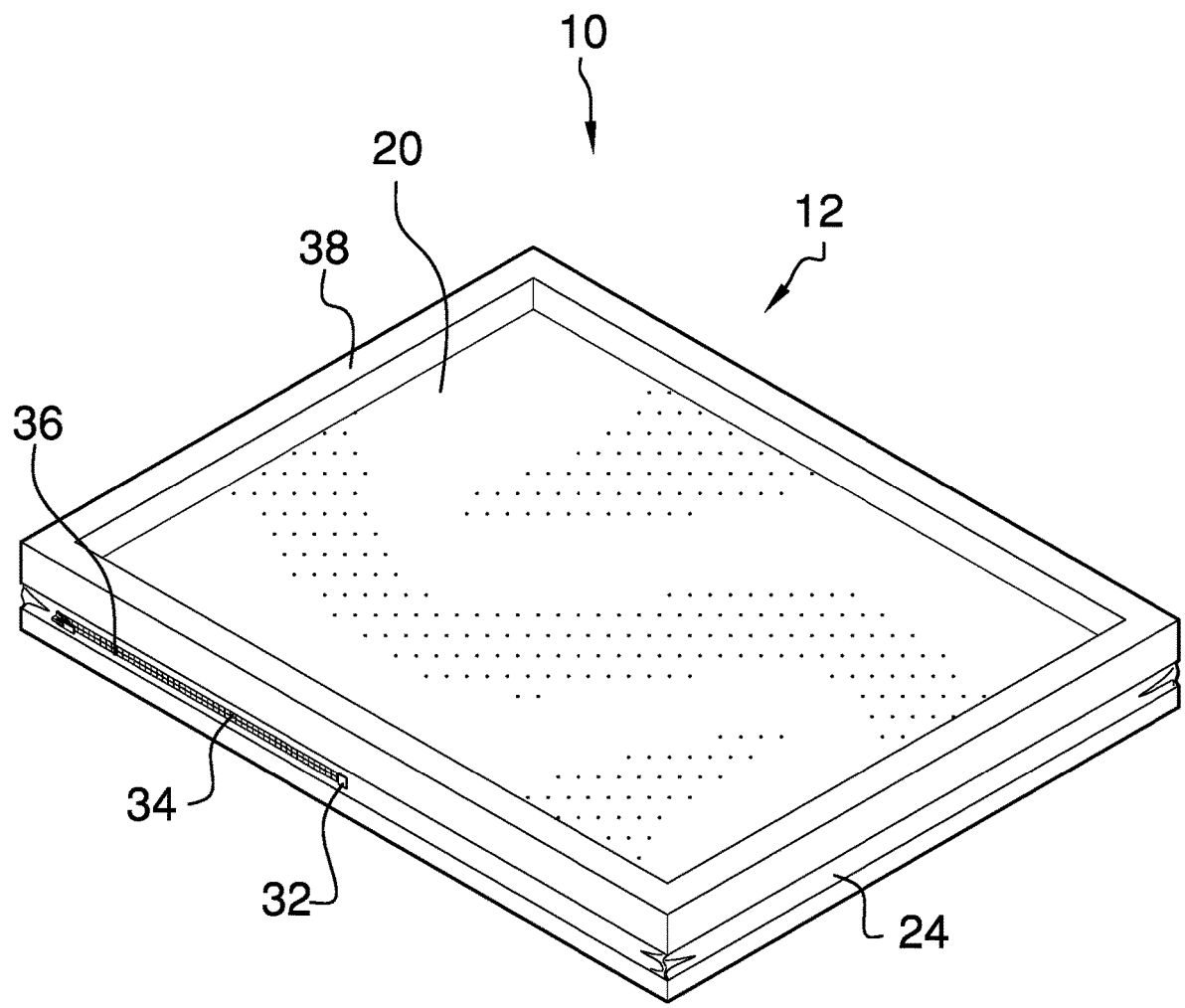
FIG. 1 is a top perspective view of an odor eliminating pet bed assembly according to an embodiment of the disclosure.
Figure 2:
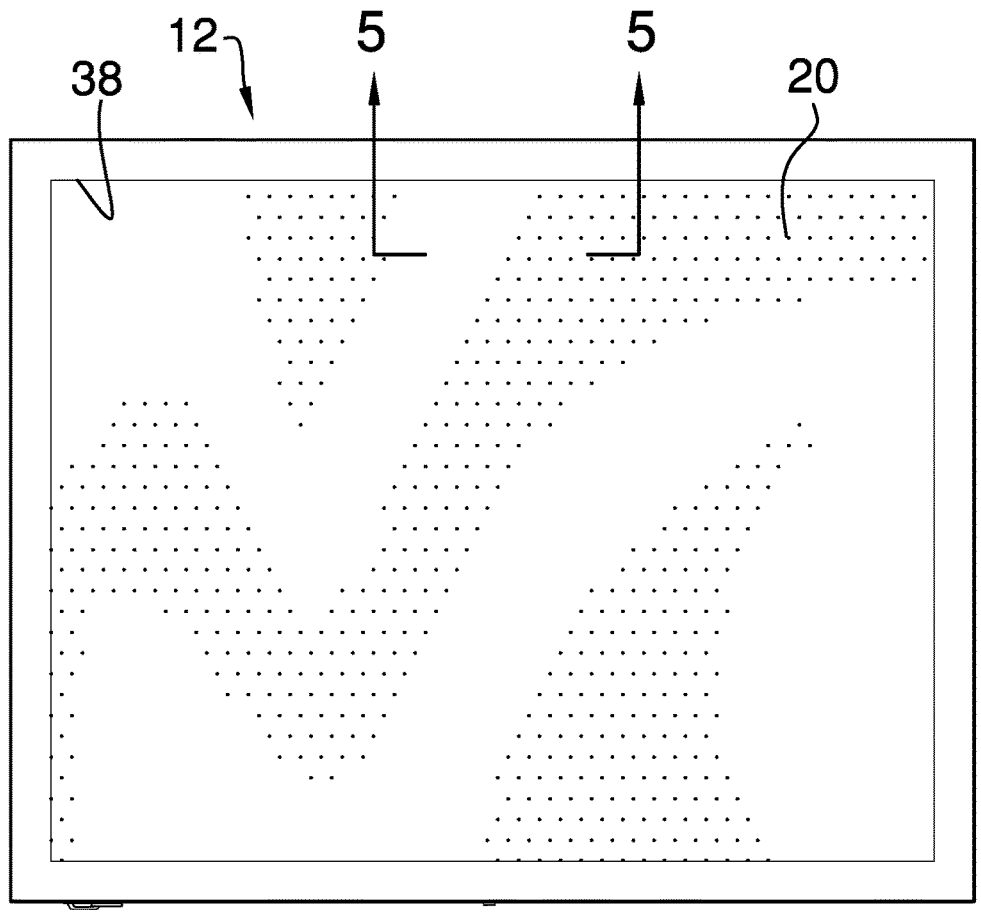
FIG. 2 is a top view of an embodiment of the disclosure.
Figure 3:
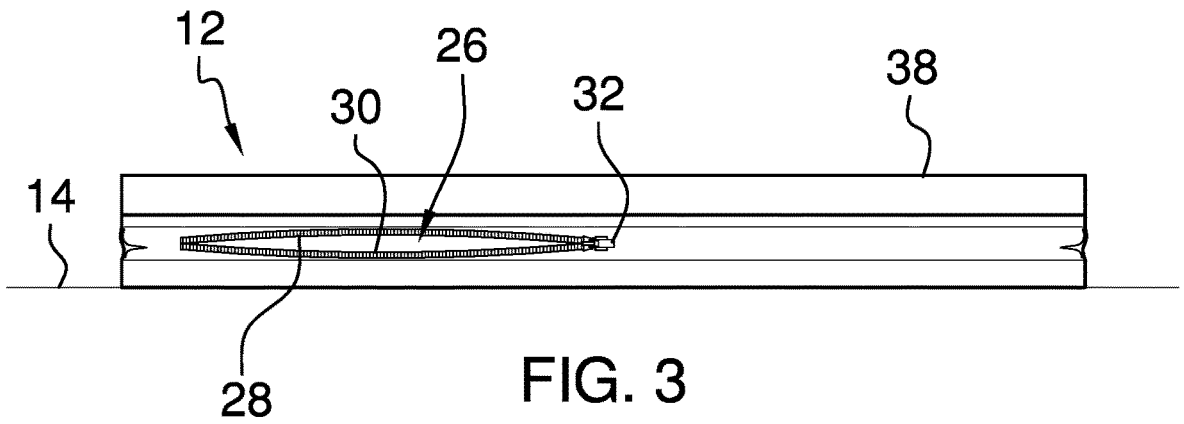
FIG. 3 is a front view of an embodiment of the disclosure.
Figure 4:
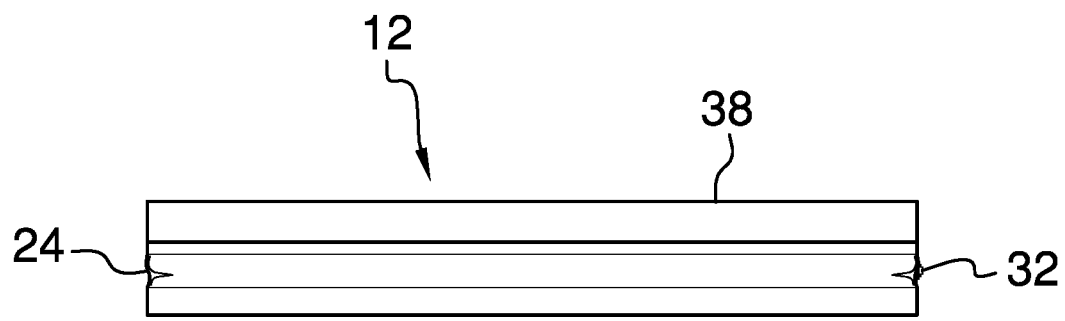
FIG. 4 is a right side view of an embodiment of the disclosure.
Figure 5:
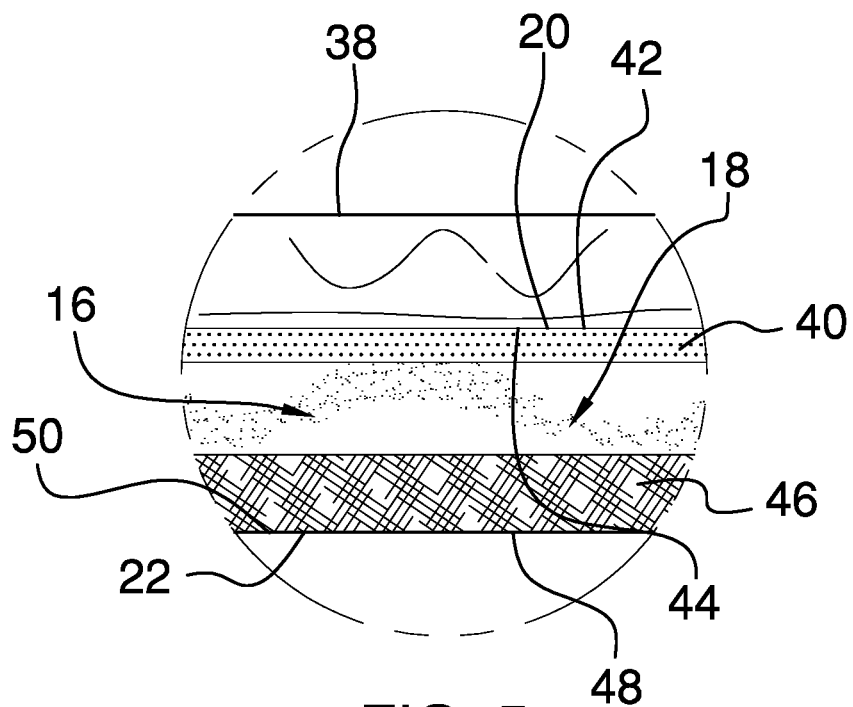
FIG. 5 is a cross sectional view taken alone line 5-5 of FIG. 2 of an embodiment of the disclosure.

With reference now to the drawings, and in particular to FIGS. 1 through 5 thereof, a new pet bed device embodying the principles and concepts of an embodiment of the disclosure and generally designated by the reference numeral 10 will be described.

As best illustrated in FIGS. 1 through 5, the odor eliminating pet bed assembly 10 generally comprises a pet bed 12 that is positionable on a support surface 14 for having a pet, such as a dog, cat or any other domesticated animal, lie thereon. A chamber 16 is integrated into the pet bed 12 for receiving an odor absorbing material 18 thereby reducing odors associated with pets. The odor absorbing material 18 may include, but not be limited to, a powder such as baking soda, a granular chemical odor absorber or any other type of dry, odor absorbing material. Additionally, the odor absorbing material 18 may have therapeutic benefits for skin conditions of which the pet may suffer.

The pet bed 12 has a top wall 20, a bottom wall 22 and a perimeter wall 24 extending therebetween, and the chamber 16 is positioned between the top wall 20 and the bottom wall 22. The top wall 20 is comprised of a fluid permeable material to pass the odor absorbing material 18 therethrough. The perimeter wall 24 has a cut 26 extending into the chamber 16 to receive the odor absorbing material 18 and the cut 26 has a first bounding edge 28 and a second bounding edge 30. A mating member 32 is coupled to the pet bed 12 and the mating member 32 is aligned with the cut 26 in the perimeter wall 24 for opening or closing the cut 26. The mating member 32 includes a first portion 34 that is coextensive with the first bounding edge 28 of the cut 26. Additionally, the mating member 32 includes a second portion 36 that is coextensive with the second bounding edge 30 of the cut 26. The first portion 34 is matable or un-matable from the second portion 36, and the mating member 32 may comprise a zipper or other similar mechanically releasable mating member.

A pad 38 is coupled to and extends upwardly from the pet bed 12 to define a border extending around the pet bed 12 and the pad 38 is positioned on the top wall 20 of the pet bed 12. The pad 38 is coextensive with an intersection between the top wall 20 and the perimeter wall 24. The pad 38 may be comprised of a resiliently compressible material to enhance comfort for the pet.

A permeable cushion 40 is positioned within the pet bed 12 to have the pet lie thereon when the pet is in the pet bed 12. The permeable cushion 40 is comprised of a fluid permeable material to pass the odor absorbing material 18 therethrough. Additionally, the permeable cushion 40 is comprised of a resiliently compressible material to enhance comfort for the pet. The permeable cushion 40 has a top surface 42 and the top surface 42 is bonded to a lower surface 44 of the top wall 20 of the pet bed 12 having the permeable cushion 40 completely covering the lower surface 44 of the top wall 20.

An impermeable cushion 46 is positioned within the pet bed 12 to have the pet lie thereon when the pet is in the pet bed 12. The impermeable cushion 46 is comprised of a fluid impermeable material to inhibit the odor absorbing material 18 from passing therethrough. Additionally, the impermeable cushion 46 is comprised of a resiliently compressible material to enhance comfort for the pet. The impermeable cushion 46 has a bottom surface 48 and the bottom surface 48 is bonded to a top surface 50 of the bottom wall 22 of the pet bed 12. Moreover, the impermeable cushion 46 completely covers the top surface 50 of the bottom wall 22.

In use, the odor absorbing material 18 is poured through the cut 26 to fill the chamber 16 within the pet bed 12 to a desired level. The mating member 32 is manipulated to close the cut 26 and the pet bed 12 is positioned at a preferred location. In this way the odor absorbing material 18 absorbs odors associated with pets and the pet bed 12. Moreover, the odor absorbing material 18 facilitates therapeutic benefits for skin condition from which the pet might suffer. The impermeable cushion 46 inhibits the odor absorbing material 18 from being deposited on a floor or whatever surface upon which the pet bed 12 is positioned. The permeable cushion 40 facilitates the odor absorbing material 18 to pass onto the pet when the pet lies on the pet bed 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An odor eliminating pet bed assembly being fillable with an odor absorbing material to reduce odors associated with pet beds, said assembly comprising:
   a pet bed being positionable on a support surface wherein said pet bed is configured to have a pet lie thereon, said pet bed having a chamber being integrated therein for receiving an odor absorbing material wherein said pet bed is configured to reduce odors associated with pets;
   a pad being coupled to and extending upwardly from said pet bed to define a border extending around said pet bed;
   a permeable cushion being positioned within said pet bed wherein said permeable cushion is configured to have the pet lie thereon when the pet is in said pet bed, said permeable cushion being comprised of a fluid permeable material wherein said permeable cushion is configured to pass the odor absorbing material therethrough, said permeable cushion being comprised of a resiliently compressible material wherein said permeable cushion is configured to enhance comfort for the pet; and
   an impermeable cushion being positioned within said pet bed wherein said impermeable cushion is configured to have the pet lie thereon, said impermeable cushion being comprised of a fluid impermeable material wherein said impermeable cushion is configured to inhibit the odor absorbing material from passing therethrough, said impermeable cushion being comprised of a resiliently compressible material wherein said impermeable cushion is configured to enhance comfort for the pet.

2. The assembly according to claim 1, wherein:
   said pet bed has a top wall, a bottom wall and a perimeter wall extending therebetween, said chamber being positioned between said top wall and said bottom wall, said top wall being comprised of a fluid permeable material wherein said top wall is configured to pass the odor absorbing material therethrough; and
   said pad being positioned on said top wall of said pet bed, said pad being coextensive with an intersection between said top wall and said perimeter wall.

3. The assembly according to claim 1, wherein said pet bed has a perimeter wall, said perimeter wall having a cut extending into said chamber wherein said cut is configured to receive the odor absorbing material, said cut having a first bounding edge and a second bounding edge.

4. The assembly according to claim 3, further comprising a mating member being coupled to said pet bed, said mating member being aligned with said cut in said perimeter wall, said mating member opening or closing said cut, said mating member including a first portion being coextensive with said first bounding edge of said cut, said mating member including a second portion being coextensive with said second bounding edge of said cut, said first portion being matable or un-matable from said second portion.

5. The assembly according to claim 2, wherein said permeable cushion has a top surface, said top surface being bonded to a lower surface of said top wall of said pet bed, said permeable cushion completely covering said lower surface of said top wall.

6. The assembly according to claim 2, wherein said impermeable cushion has a bottom surface, said bottom surface being bonded to a top surface of said bottom wall of said pet bed.

7. An odor eliminating pet bed assembly being fillable with an odor absorbing material to reduce odors associated with pet beds, said assembly comprising:

a pet bed being positionable on a support surface wherein said pet bed is configured to have a pet lie thereon, said pet bed having a chamber being integrated therein for receiving an odor absorbing material wherein said pet bed is configured to reduce odors associated with pets, said pet bed having a top wall, a bottom wall and a perimeter wall extending therebetween, said top wall being comprised of a fluid permeable material wherein said top wall is configured to pass the odor absorbing material therethrough, said chamber being positioned between said top wall and said bottom wall, said perimeter wall having a cut extending into said chamber wherein said cut is configured to receive the odor absorbing material, said cut having a first bounding edge and a second bounding edge, a mating member being coupled to said pet bed, said mating member being aligned with said cut in said perimeter wall, said mating member opening or closing said cut, said mating member including a first portion being coextensive with said first bounding edge of said cut, said mating member including a second portion being coextensive with said second bounding edge of said cut, said first portion being matable or un-matable from said second portion;

a pad being coupled to and extending upwardly from said pet bed to define a border extending around said pet bed, said pad being positioned on said top wall of said pet bed, said pad being coextensive with an intersection between said top wall and said perimeter wall;

a permeable cushion being positioned within said pet bed wherein said permeable cushion is configured to have the pet lie thereon when the pet is in said pet bed, said permeable cushion being comprised of a fluid permeable material wherein said permeable cushion is configured to pass the odor absorbing material therethrough, said permeable cushion being comprised of a resiliently compressible material wherein said permeable cushion is configured to enhance comfort for the pet, said permeable cushion having a top surface, said top surface being bonded to a lower surface of said top wall of said pet bed, said permeable cushion completely covering said lower surface of said top wall;

an impermeable cushion being positioned within said pet bed wherein said impermeable cushion is configured to have the pet lie thereon, said impermeable cushion being comprised of a fluid impermeable material wherein said impermeable cushion is configured to inhibit the odor absorbing material from passing therethrough, said impermeable cushion being comprised of a resiliently compressible material wherein said impermeable cushion is configured to enhance comfort for the pet, said impermeable cushion having a bottom surface, said bottom surface being bonded to a top surface of said bottom wall of said pet bed.

\* \* \* \* \*